United States Patent
Handa

(10) Patent No.: US 10,042,151 B2
(45) Date of Patent: Aug. 7, 2018

(54) INTERFERENCE OBJECTIVE LENS AND REFERENCE SURFACE UNIT SET

(71) Applicant: MITUTOYO CORPORATION, Kawasaki-shi, Kanagawa (JP)

(72) Inventor: Hirohisa Handa, Kawasaki (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 0 days.

(21) Appl. No.: 15/353,134

(22) Filed: Nov. 16, 2016

(65) Prior Publication Data

US 2017/0139194 A1 May 18, 2017

(30) Foreign Application Priority Data

Nov. 17, 2015 (JP) .................. 2015-224416

(51) Int. Cl.

| | | |
|---|---|---|
| *G02B 21/02* | (2006.01) | |
| *G02B 21/24* | (2006.01) | |
| *G02B 21/06* | (2006.01) | |
| *G02B 21/36* | (2006.01) | |
| *G01B 11/24* | (2006.01) | |
| *G01B 9/02* | (2006.01) | |

(52) U.S. Cl.
CPC ......... *G02B 21/24* (2013.01); *G01B 9/02041* (2013.01); *G01B 11/24* (2013.01); *G02B 21/02* (2013.01); *G02B 21/06* (2013.01); *G02B 21/361* (2013.01)

(58) Field of Classification Search
CPC ................ G02B 21/00; G02B 21/0016; G02B 21/0028; G02B 21/0052; G02B 21/0056; G02B 21/02; G02B 21/06; G02B 21/24; G02B 21/361; G02B 21/362; G01B 9/02; G01B 11/24; G01B 11/2441; G01M 11/005

See application file for complete search history.

(56) References Cited

U.S. PATENT DOCUMENTS

| | | | | |
|---|---|---|---|---|
| 4,269,508 A | * | 5/1981 | Le Nevez | H01Q 1/125 356/147 |
| 4,336,969 A | * | 6/1982 | Kahlert | B41F 13/20 384/247 |
| 5,465,147 A | * | 11/1995 | Swanson | A61B 1/00183 356/497 |

(Continued)

FOREIGN PATENT DOCUMENTS

| | | | |
|---|---|---|---|
| EP | 1635137 | * | 3/2006 |
| JP | H05-118831 | | 5/1993 |

(Continued)

*Primary Examiner* — Thong Nguyen
(74) *Attorney, Agent, or Firm* — Rankin, Hill & Clark LLP

(57) ABSTRACT

An interference objective lens includes: an objective lens configured to converge a light to be emitted from a light source toward a measurement target; a reference surface unit having a reference surface; and a beam splitter configured to split the light having passed through the objective lens into a reference optical path facing toward the reference surface and a measurement optical path facing toward the measurement target, to synthesize a reflected light from the reference surface and a reflected light from the measurement target, and to output the same as an interference light, wherein the reference surface unit is configured to be replaceable.

4 Claims, 10 Drawing Sheets

(56) References Cited

U.S. PATENT DOCUMENTS

| | | | | |
|---|---|---|---|---|
| 7,061,625 B1* | 6/2006 | Hwang | ............ | G01B 11/2441 356/497 |
| 7,443,516 B2* | 10/2008 | Takahashi | .......... | G01B 11/2441 356/515 |
| 8,947,676 B2* | 2/2015 | Furukawa | ............ | G01B 11/24 356/512 |
| 2005/0140981 A1* | 6/2005 | Waelti | ................ | A61B 3/1005 356/479 |
| 2011/0032504 A1* | 2/2011 | Sasaki | ............... | G01B 11/2441 355/72 |
| 2013/0077100 A1* | 3/2013 | Fukui | ............... | G01B 11/2441 356/511 |

FOREIGN PATENT DOCUMENTS

| | | |
|---|---|---|
| JP | 2000-193891 | 7/2000 |
| JP | 2005-538359 | 12/2005 |
| JP | 2007-536539 | 12/2007 |
| WO | 2004/023071 | 3/2004 |
| WO | 2005/108915 | 11/2005 |

* cited by examiner

104

INTERFERENCE OBJECTIVE LENS AND REFERENCE SURFACE UNIT SET

CROSS-REFERENCE TO RELATED APPLICATION(S)

This application is based upon and claims the benefit of priority from Japanese Patent Application No. 2015-224416, filed on Nov. 17, 2015, the entire contents of which are incorporated herein by reference.

BACKGROUND

1. Field of the Invention

The disclosure relates to an interference objective lens and a reference surface unit set to be used for a microscope and an image measurement device or a fine shape measurement device based on the microscope.

2. Description of the Related Art

In fields of measuring a surface texture of a metal surface to be processed and a shape and a step of a circuit pattern of a semiconductor integrated circuit and measuring a thickness of a transparent thin film, an optical macro magnification observation device of a low magnification or an optical microscope having a higher magnification than the device is provided with an interference function and an observed interference fringe is subjected to image processing, so that a fine surface shape is measured with high precision.

In the magnification optical device capable of performing the interference measurement, a member or structure configuring an interference system has an objective lens integrally formed thereto and functions as an interference system, as a single member. The objective lens is referred to as an interference objective lens. The general interference objective lens has an objective lens, a reference surface and a beam splitter. The objective lens is configured to converge light emitted from a light source toward a measurement target. The light converged by the objective lens is split at the beam splitter into a reference optical path facing toward the reference surface becoming a reference and a measurement optical path facing toward a measurement target surface (surface to be measured). The light having passed the reference optical path is reflected on the reference surface, and the light having passed the measurement optical path is reflected on the surface to be measured. The reflected lights are again synthesized at the beam splitter, which is then output as an interference light.

As the light source for causing the interference, white light that is to be generated by an incandescent lamp, an LED or the like, is usually used. Since the white light has low interference, the interference intensity becomes a peak in a narrow range within which an optical path difference between the reference optical path and the measurement optical path is close to zero (0). For this reason, when the interference objective lens is scanned in a height direction (optical axis direction) (a measurement optical path length is changed), heights at which the brightness of the interference fringe becomes a peak are respectively detected at each pixel position in a viewing field of an imaging device, so that it is possible to precisely measure a three-dimensional shape and the like of the measurement target.

Regarding the interference objective lens, a Michelson type and a Mirau type are generally used. The Michelson type is a structure having a reference surface on an optical axis separately provided from a measurement target, and is mainly used for an objective lens of low magnification of 5 magnifications or less. The Mirau type is a structure having a reference surface on the same optical axis as a measurement target, and is used for an objective lens of high magnification incapable of taking a long working distance, as compared to the Michelson type.

JP-A-2005-538359, JP-A-2007-536539 and JP-A-H05-118831 disclose the interference microscope and the interference objective lens of the related art, and Patent JP-A-2000-193891 discloses an adjusting mechanism.

In the case of the microscope objective lens of relatively low magnification, since the numerical aperture (NA) is small, the light is incident on a surface to be measured at a small inclination relative to an optical axis and a working distance becomes longer. Therefore, the microscope objective lens is likely to be influenced by the reflectivity inherent to the surface to be measured having diverse reflectivity, such as a metal surface and a glass surface. For example, upon the actual measurement, when a measurement target having a surface texture of which reflectivity is low, such as glass, is observed by using an interference objective lens having a reference surface with which a contrast of the optimal interference fringe is obtained on a metal reflective surface having high reflectivity, the contrast of a white interference fringe is lowered.

In order to solve the above problem, it is considered to appropriately select and use a reference surface having an optimal reflectivity corresponding to the reflectivity of the measurement target.

However, the white light that is to be used for the interference measurement is incoherent light having a low interference possibility. Therefore, in order to generate the interference, it is necessary to strictly match an optical path length of the measurement optical path on which the measurement target is to be arranged and an optical path length of the reference optical path on which the reference surface is to be arranged. For example, a range in which a clear interference fringe is observed in an optical axis direction is usually a very narrow range of 1 µm or less, and when the optical path lengths are not strictly matched, the interference fringe cannot be obtained as an image. For this reason, a strict positional relation among the split synthesis means, the reference surface and the surface to be measured is required. Also, since the surface to be measured is a focal position of the objective lens, the great difficulty is caused upon manufacturing of a component and during an assembling process. Due to the situations, the interference objective lens is generally shipped with being adjusted and fixed so that the white interference fringe occurs at an ideal focal position of the lens.

Therefore, it is actually difficult to arbitrarily select the reference surface of the interference objective lens in accordance with the measurement target, and it is necessary to prepare a plurality of interference objective lenses each of which has a reference surface corresponding to the reflectivity of the measurement target. Also, when the interference objective lens is integrally provided with the measurement device, it is necessary to prepare a plurality of measurement devices.

SUMMARY

An object of the disclosure is to provide an interference objective lens and a reference surface unit set of which a reference surface can be detached from a main body.

(1) According to an aspect of the invention, there is provided an interference objective lens including: an objective lens configured to converge a light to be emitted from a light source toward a measurement target; a reference surface unit having a reference surface; and a beam splitter configured to split the light having passed through the objective lens into a reference optical path facing toward the reference surface and a measurement optical path facing toward the measurement target, to synthesize a reflected light from the reference surface and a reflected light from the measurement target, and to output the same as an interference light, wherein the reference surface unit is configured to be replaceable. In other words, the reference surface unit is mounted so that it can be freely attached and detached.

Thereby, upon interference measurement of low magnification where the reflectivity of a surface to be measured is dominant, it is possible to select and use a reference surface having an optimal surface texture and to thus obtain an interference fringe image of a favorable contrast all the time irrespective of a type of the measurement target.

(2) As the reference surface of the reference surface unit, not only a reference surface by a plain mirror of the related art but also a reference surface having an arbitrary shape other than a plane shape, a step or a shape pattern can be used. As the arbitrary shape, a shape corresponding to a surface shape of the measurement target can be used, for example. Thereby, it is possible to easily perform comparison measurement at high speed and to shorten the measurement time.

(3) A lock mechanism for fixing the inclined angle at an arbitrary angle may be provided after the reference surface unit is configured so that the inclined angle of the reference surface can be adjusted. Thereby, it is possible to adjust the inclined angle of the reference surface and to fix the adjusted angle. Therefore, when the reference surface unit of which adjustment has been completed is prepared in advance, it is possible to rapidly replace the reference surface unit and to rapidly perform the measurement, as needed. Also, it is possible to prevent the adjusted state from changing upon the measurement. Further, when the detachable inclination adjusting unit is used, it is possible to prevent the adjusted state from changing upon the attachment and detachment thereof.

(4) The inclined angle of the reference surface may be adjusted using a detachable inclination adjusting unit. By this configuration, it is possible to use not only a member configured to manually adjust an amount of inclination but also an automatic adjusting member having a PZT and an actuator embedded therein and capable of performing numerical control, as the inclination adjusting unit.

(5) When a reference surface unit set having a plurality of reference surfaces of which at least one of a reflectivity, an arbitrary shape to be formed, a step and a shape pattern of the reference surface is different from each other is prepared in advance, it is possible to perform the measurement precisely and effectively by sequentially replacing the reference surface with an appropriate reference surface corresponding to the texture of the surface to be measured.

(6) When preparing the reference surface unit set, it is possible to perform the measurement more efficiently if the adjustment of the inclined angles of the reference surfaces of the reference surface units has been completed in advance.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, illustrative embodiments of the disclosure will be described.

<First Illustrative Embodiment>

Figure 1:
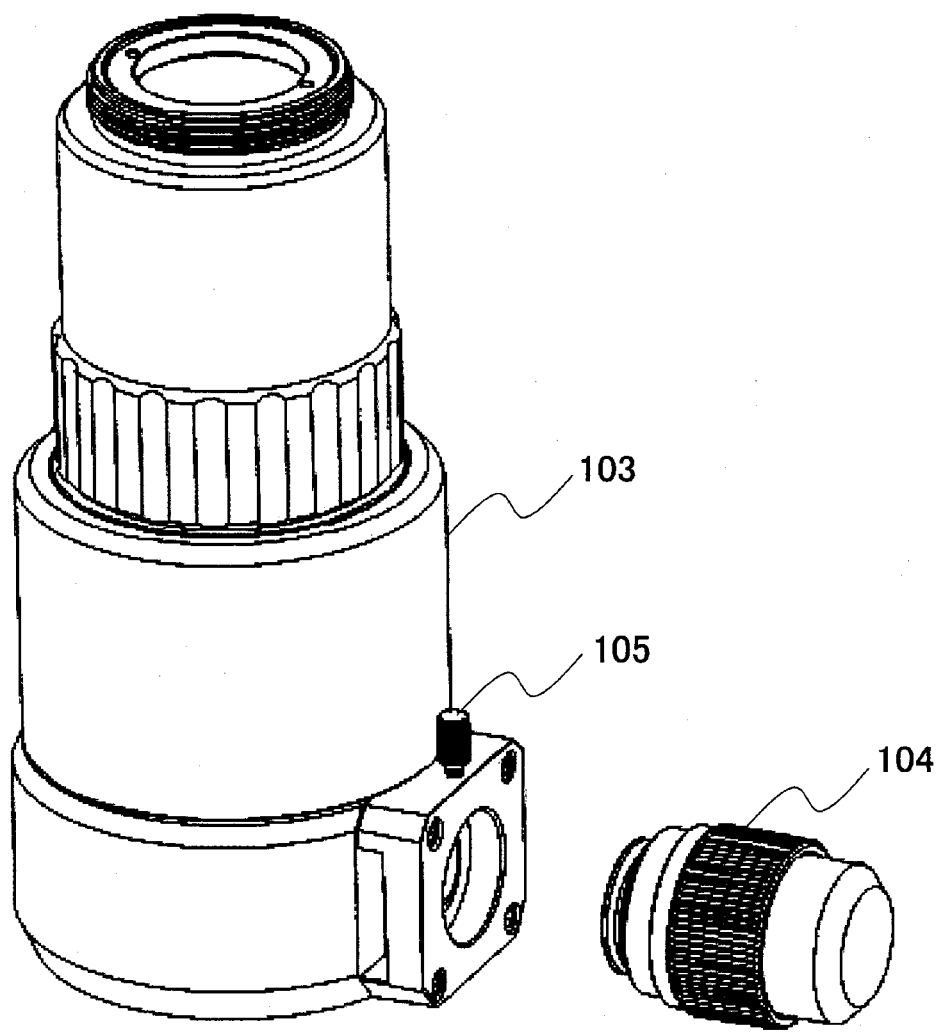
FIG. 1 is an external view depicting a configuration of an interference objective lens of a first illustrative embodiment.
Figure 2:
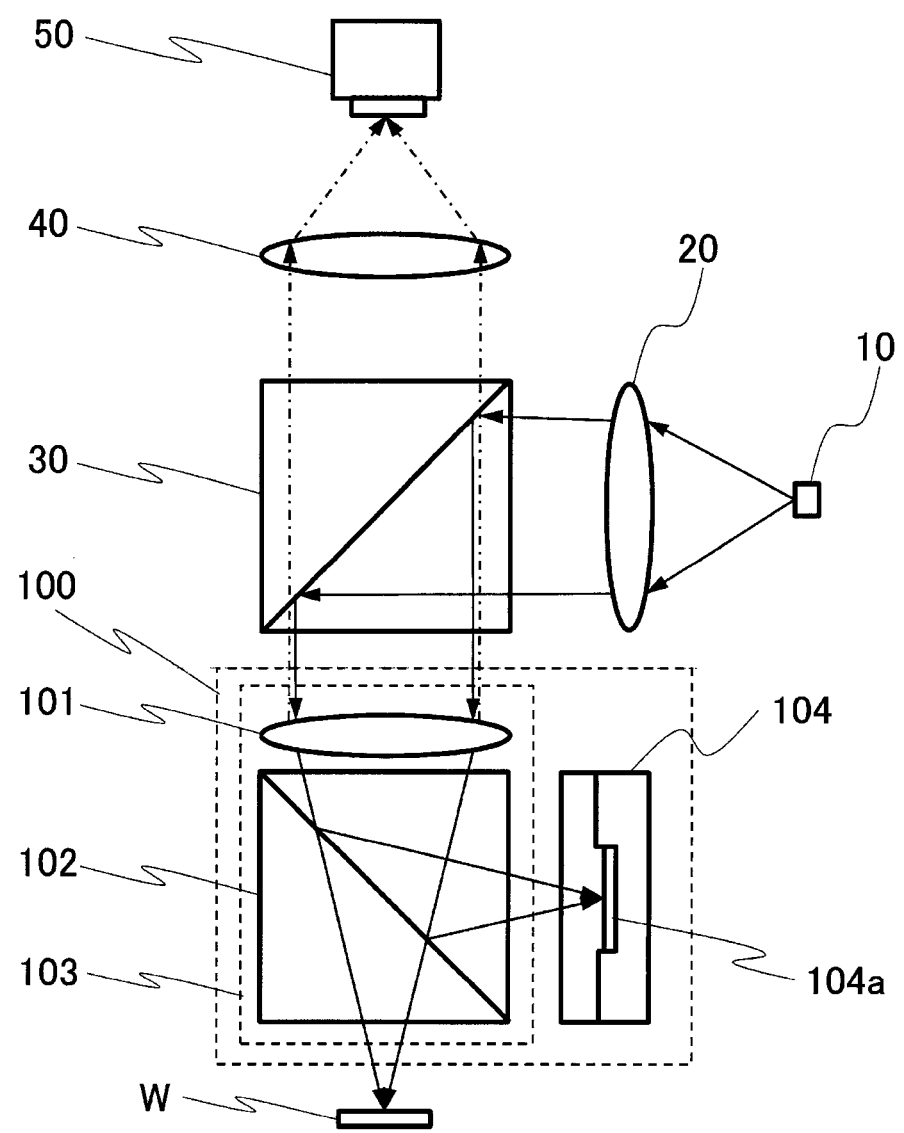
FIG. 2 is an optical configuration view of the interference objective lens of the first illustrative embodiment.

FIG. 1 is an external view depicting a configuration of an interference objective lens 100 in accordance with a first illustrative embodiment, and FIG. 2 is an optical configuration view thereof. The interference objective lens 100 has an objective lens 101, a beam splitter 102 and a reference surface unit 104.

The objective lens 101 is configured to converge light emitted from a light source 10 toward a measurement target W. In a general interference measurement device, the light emitted from the light source 10 is illuminated in parallel to a beam splitter 30 through a collimator lens 20, and a parallel beam along an optical axis is emitted from the beam splitter 30 and is incident on the objective lens 101.

The reference surface unit 104 has at least a reference surface 104a. The reference surface 104a is a surface becoming a reference of an optical path length, and is arranged on a reference optical path.

The beam splitter 102 is configured to split the light having passed through the objective lens 101 into a reference optical path facing toward the reference surface 104a and a measurement optical path facing toward the measurement target W, to synthesize a reflected light from the reference surface 104a and a reflected light from the measurement target W, and to output the same as an interference light. In the general interference measurement device, the output interference light becomes a parallel beam at the objective lens 101, straightly penetrates the beam splitter 30, is converged at an imaging lens 40 and forms an interference image on an imaging unit 50 such as a CCD camera consisting of an imaging element having a plurality of pixels arranged in a two-dimensional shape.

The reference surface unit 104 is detachably mounted to a main body 103 including the objective lens 101 and the beam splitter 102, i.e., is configured to be replaceable. For example, the reference surface unit is configured so that it is fixed to the main body 103 by a reference surface unit fixing screw 105 and is demounted from the main body by unscrewing or detaching the reference surface unit fixing screw 105.

The reference surface unit 104 is configured to be replaceable, so that upon interference measurement of low magnification where the reflectivity of a surface to be measured is dominant, it is possible to select and use a reference surface having an optimal surface texture and to thus obtain an interference fringe image of a favorable contrast all the time irrespective of a type of the measurement target. Also, it is possible to use not only a reference surface by a plain mirror of the related art but also a reference surface having an arbitrary shape other than a plane shape, a specific step or a specific shape pattern such as an IC pattern. As the arbitrary shape, a reference surface having a shape corresponding to a surface shape of the measurement target can be used, for example. Thereby, it is possible to easily perform comparison measurement at high speed and to shorten the measurement time.

<Second Illustrative Embodiment>

Figure 3A:
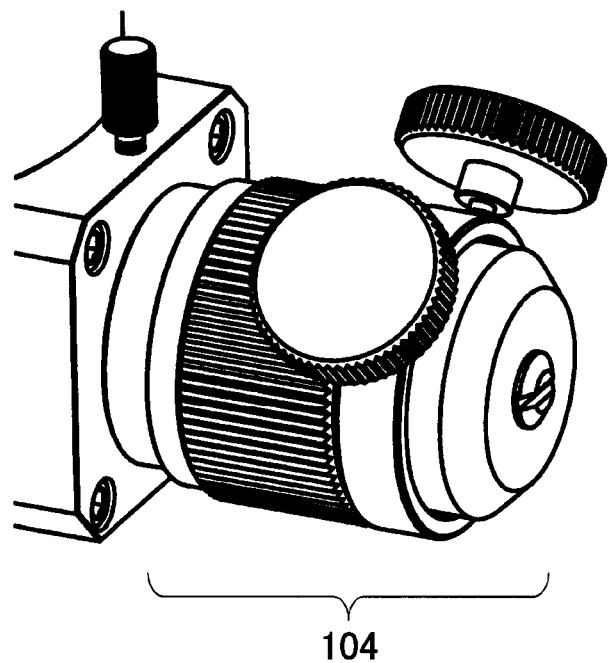
FIGS. 3A and 3B depict a reference surface unit of an interference objective lens of a second illustrative embodiment.
Figure 3B:
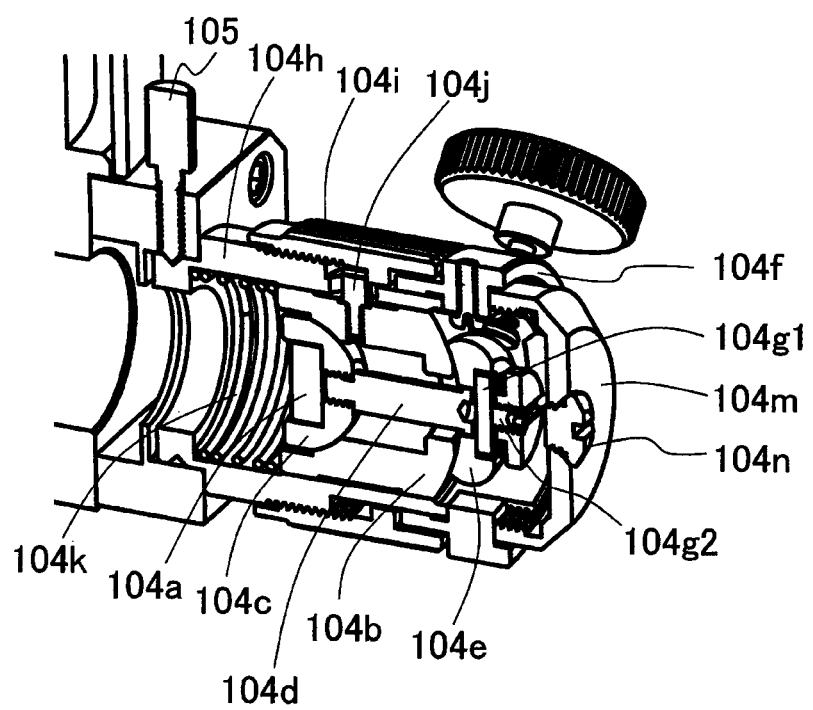
Figure 5:
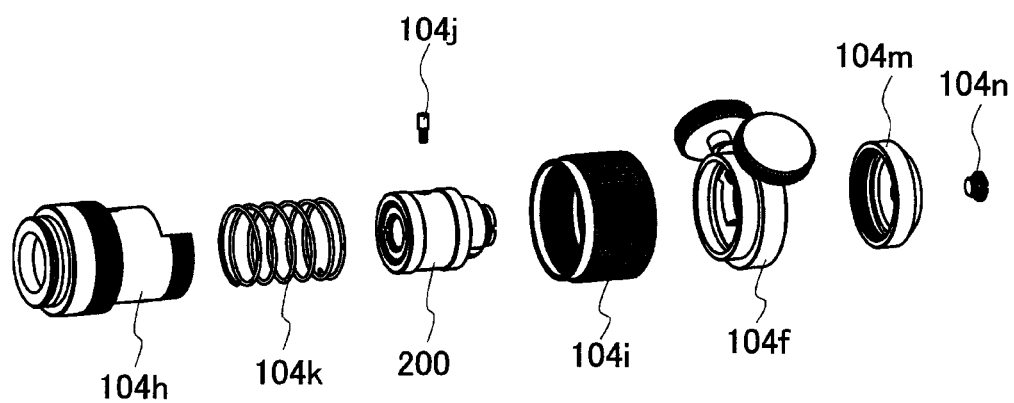
FIG. 5 is an exploded view depicting an internal configuration of the reference surface unit.
Figure 6:
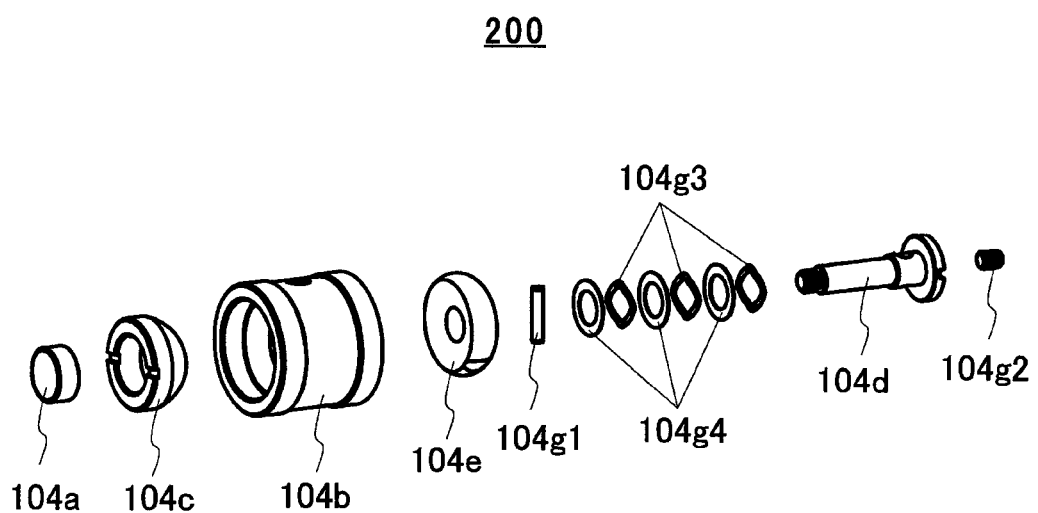
FIG. 6 is a separate exploded view showing in detail that shows one of the internal assembled components of the reference surface unit.

FIGS. 3A and 3B depict the reference surface unit 104 of an interference objective lens in accordance with a second illustrative embodiment, in which FIG. 3A depicts an outward appearance and FIG. 3B depicts an internal configuration. Also, an exploded view of the internal configuration is shown in FIGS. 5 and 6.

The interference objective lens in accordance with the second illustrative embodiment is configured so that an inclined angle of the reference surface 104a of the reference surface unit 104 of the interference objective lens 100 can be adjusted and the inclined angle can be fixed at any angle, and the main body 103 has the same configuration as that of the interference objective lens 100.

The reference surface unit 104 has a fixed bearing 104b, a reference surface moving bearing 104c, a shaft 104d, a moveable bearing 104e, an inclination adjusting unit 104f and a lock mechanism 104g, in addition to the reference surface 104a.

The fixed bearing 104b is a bearing configured so that it is restrained except for a direction along the optical axis.

The reference surface moving bearing 104c is provided to freely change an inclined posture together with the reference surface 104a at a state where the reference surface 104a is fitted thereto and it is interposed to the fixed bearing 104b.

The shaft 104d passes through the fixed bearing 104b and both ends thereof are fixed to the reference surface moving bearing 104c and the moveable bearing 104e.

The moveable bearing 104e is provided to freely change an inclined posture. When the inclined posture changes, the change in the inclined posture is transmitted to the reference surface moving bearing 104c via the shaft 104d. Contact surfaces of the reference surface moving bearing 104c and the fixed bearing 104b and contact surfaces of the fixed bearing 104b and the moveable bearing 104e have arbitrary shapes. However, as shown in FIG. 3B, for example, when the contact surfaces are configured as spherical surfaces, it is possible to smoothly change the inclined posture and to securely transmit the inclination to the reference surface moving bearing 104c.

Figure 4:
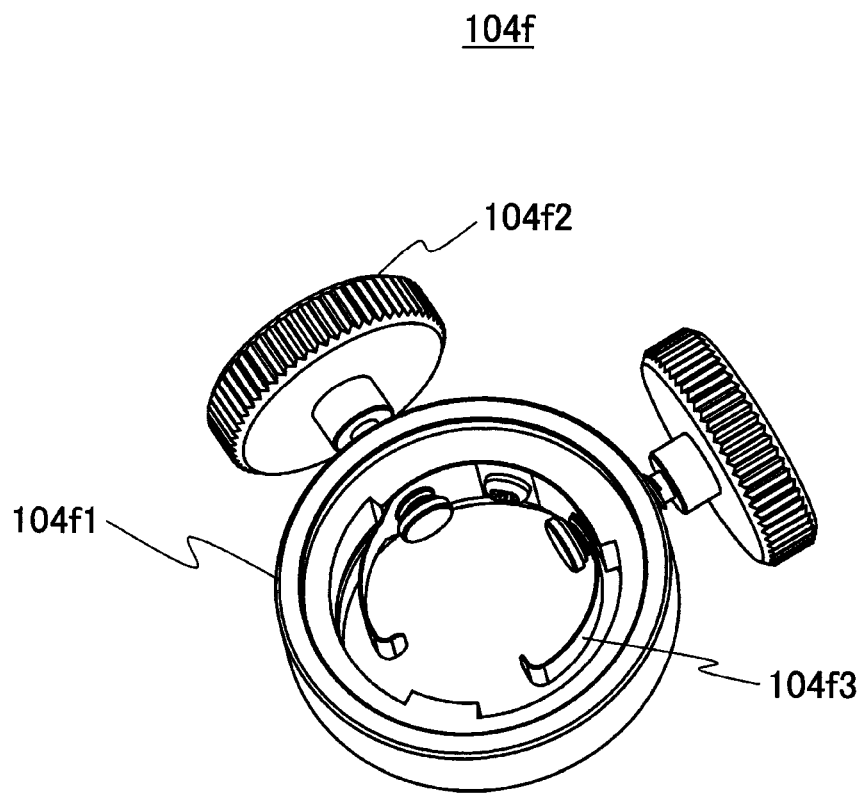
FIG. 4 depicts a configuration example of an inclination adjusting unit.

The inclination adjusting unit 104f has a cylindrical main body 104f1 and an inclination adjusting knob 104f2 having a protrusion penetrating the cylinder from an outside and capable of changing a protruding level of the protrusion into the cylinder. The inclination adjusting knob 102f2 is preferably provided in plural from a standpoint of easy adjustment. A configuration example is shown in FIG. 4. The inclination adjusting unit 104f is provided so that the cylindrical main body 104f1 surrounds the moveable bearing 104e. At this state, when the inclination adjusting knob 104f2 is adjusted to protrude the protrusion, a tip of the protrusion is pressed to an outer wall of the moveable bearing 104e. By the pressing force, it is possible to change the inclined posture of the moveable bearing 104e. At this time, when the outer wall of the moveable bearing 104e is configured to have a spherical shape, for example, it is possible to change the inclined angle more smoothly.

The lock mechanism 104g has a fixing pin 104g1 and a fixing screw 104g2. The fixing pin 104g1 is provided with penetrating a hole formed on a side surface of the shaft 104d. The fixing screw 104g 2 is arranged in a screw hole provided in an axial direction of the shaft 104d. When the fixing screw 104g2 is screwed, the fixing pin 104g1 acts on the moveable bearing 104e, so that the moveable bearing 104e is pressed to the fixed bearing 104b and the inclined posture of the moveable bearing 104e is thus fixed. The inclined posture of the reference surface moving bearing 104c is fixed via the shaft 104d, so that the inclined angle of the reference surface 104a is also fixed. In order to smoothly change the inclined posture of the moveable bearing 104e with the fixing screw 104g2 being released, springs 104g3 and washers 104g4 may be provided so that the two moveable bearings are applied with appropriate pressurization.

Herein, the lock mechanism 104g is implemented by the fixing pin 104g1 and the fixing screw 104g2. However, a disc-shaped member other than the pin may be used. Also, a fixed state may be made in advance by a spring force, instead of the screw fastening, a lever may be configured using another member and the fixed state may be released by operating the lever.

According to the above configuration, it is possible to adjust the inclined angle of the reference surface and to fix the adjusted angle. Therefore, when the reference surface unit of which adjustment has been completed is prepared in advance, it is possible to rapidly replace the reference surface unit and to rapidly perform the measurement, as needed. Also, it is possible to prevent the adjusted state from changing upon the measurement. Further, when the detachable inclination adjusting unit is used, it is possible to prevent the adjusted state from changing upon the attachment and detachment thereof.

In order to obtain a white interference fringe having a high contrast upon the interference measurement, it is preferably to adjust not only the inclination of the reference surface but also a length of the reference optical path. The reference surface unit 104 shown in FIGS. 3A, 3B, 4 and 5 includes a configuration of enabling the adjusting mechanism (hereinafter, referred to as "reference surface adjusting unit") of the inclined angle of the reference surface described in the second illustrative embodiment to entirely slide in the optical axis direction so as to adjust the length of the reference optical path. In the below, the corresponding configuration is also described.

The reference surface unit 104 further has a housing 104h, an adjusting screw 104i, a driving pin 104j and a spring 104k. The housing 104h is a cylindrical member of which a central axis is the optical axis, for example, and the reference surface adjusting unit is inserted into the cylinder. For this reason, the reference surface adjusting unit slides in the cylinder, so that it is possible to slide the reference surface 104a positioned at a tip of the reference surface adjusting unit in the optical axis direction. The adjusting screw 104i is a cylindrical member provided on an outer periphery of a boundary part between the housing 104h and the reference surface adjusting unit. The adjusting screw 104i has a flange-shaped protrusion on an inner wall thereof, and is configured to be screwed to the housing 104*h*. The driving pin 104*j* is provided to protrude from the fixed bearing 104*b* so that it is engaged to the flange-shaped protrusion when screwing the adjusting screw 104*i* to the housing 104*h*. By this configuration, when the adjusting screw 104*i* is screwed to the housing 104*h*, the flange-shaped protrusion collides with the driving pin 104*j*, so that it is possible to slide the reference surface adjusting unit in the optical axis direction (a direction in which the length of the reference optical path is shortened). Further, the spring 104*k*, which is configured to be shortened by pushing the reference surface adjusting unit into the housing 104*h*, is provided in the housing 104*h*, so that when the adjusting screw 104*i* is turned in an opposite direction, it is possible to slide the reference surface adjusting unit in the optical axis direction (a direction in which the length of the reference optical path is lengthened) by a repulsive force of the spring.

<Third Illustrative Embodiment>

Figure 7:
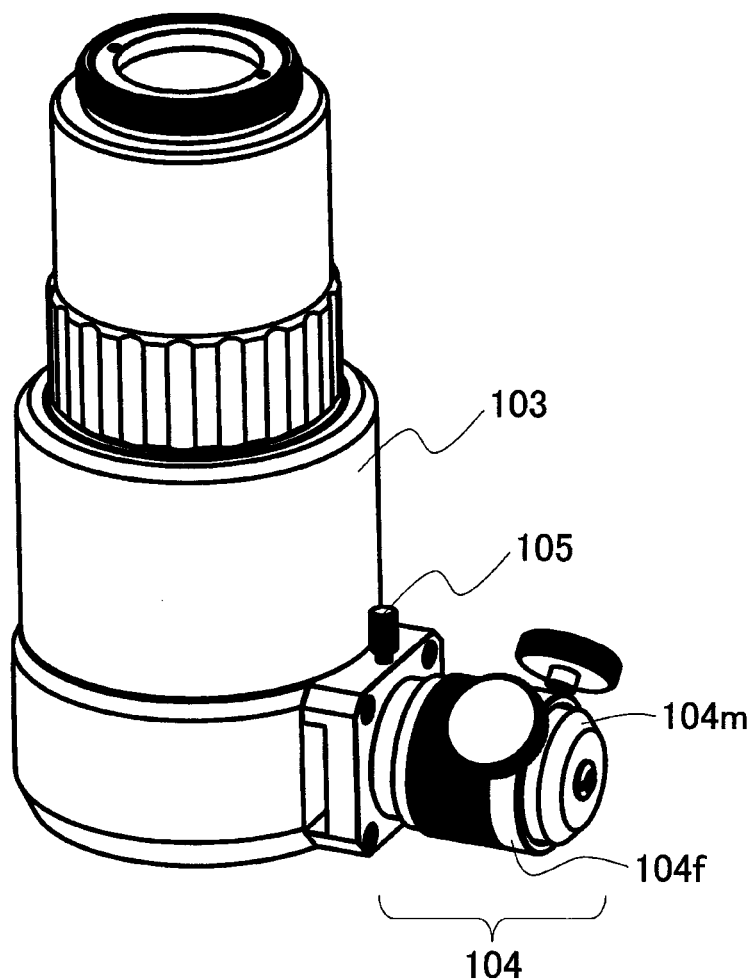
FIG. 7 depicts the inclination adjusting unit at a mounted state.

In the configuration of the second illustrative embodiment, the inclination adjusting unit 104*f* can be demounted from the reference surface unit 104. FIG. 7 depicts a mounted state of the inclination adjusting unit 104*f*, and FIG. 8 depicts a demounted state thereof.

Figure 8:
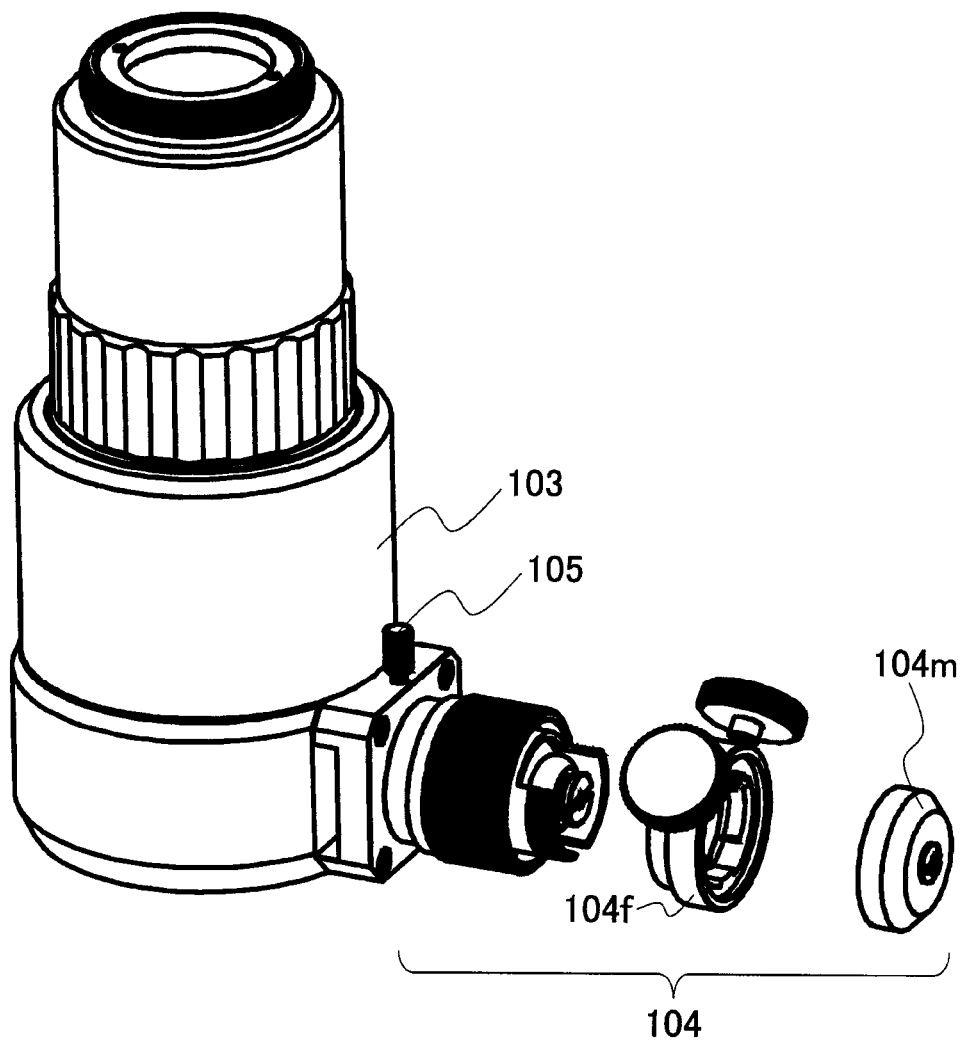
FIG. 8 depicts the inclination adjusting unit at a demounted state.

FIGS. 7 and 8 depict an example of the configuration of enabling the inclination adjusting unit 104*f* to be easily fixed to and demounted from the reference surface unit 10 by providing a cap 104*m* for the inclination adjusting unit 104*f* and screwing a cap screw 104*n* to the cap 104*m*. However, the configuration of enabling the demounting and fixing is not limited thereto. For example, the inclination adjusting unit 104*f* may be provided with a screw or a lock mechanism for demounting and fixing so as to implement the demounting and fixing.

Figure 9:
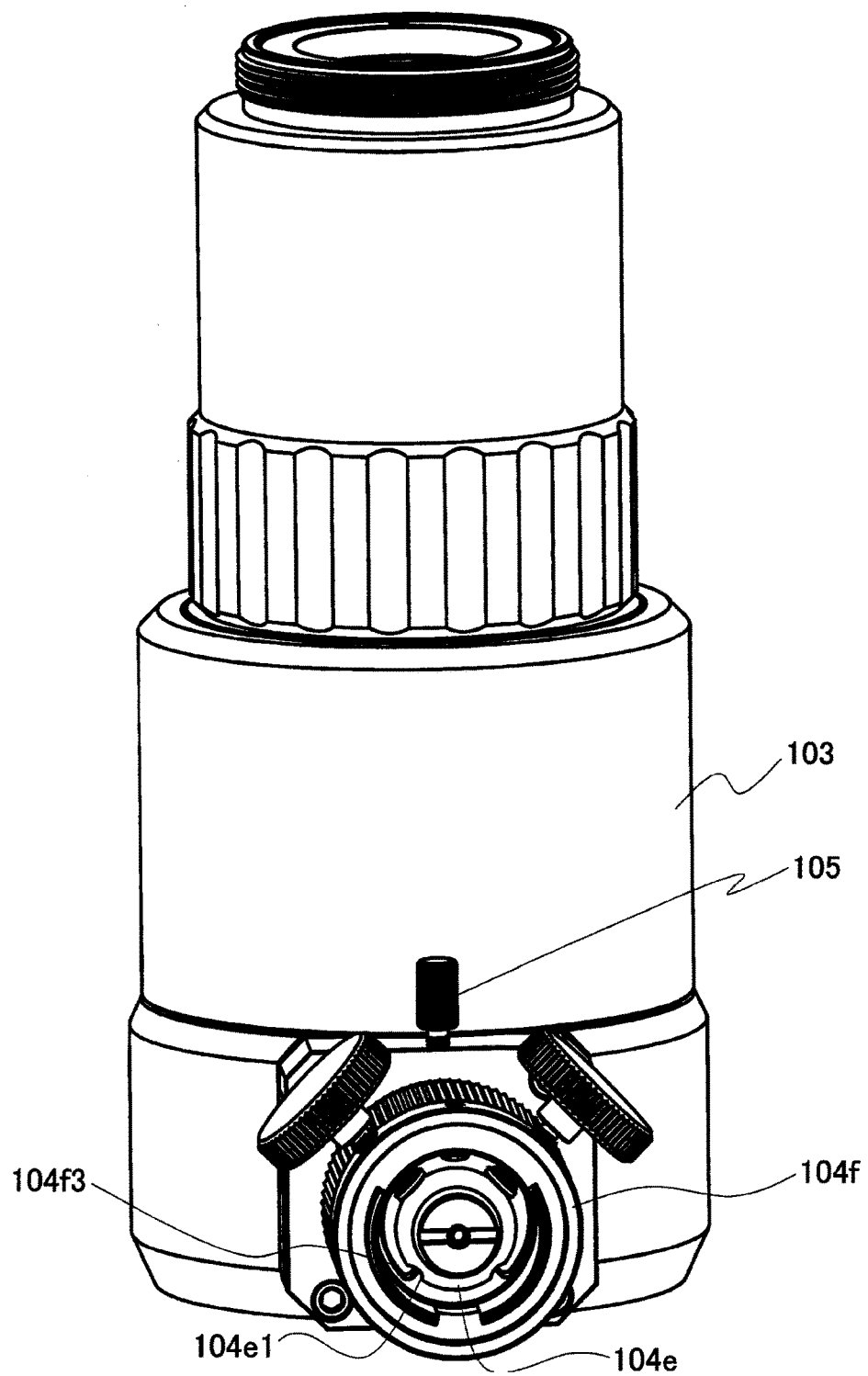
FIG. 9 illustrates a fitting state between a return spring and notched parts.

When the inclination adjusting unit 104*f* is configured to be detachable, the inclination adjusting unit 104*f* is preferably securely fixed to the reference surface unit 104 at the mounted state even though the inclination adjusting knob 104*f*2 is operated. Therefore, for example, preferably, the inclination adjusting unit 104*f* is provided with a return spring 104*f*3 having claws formed at both end thereof, as shown in FIG. 4, the moveable bearing 104*e* is provided with notched parts 104*e*1, as shown in FIG. 9, and the inclination adjusting unit 104*f* is mounted with positions of the claws of the return spring 104*f*3 being matched with the notched parts 104*e*1. By this configuration, the inclination adjusting unit 104*f* is securely fixed to the reference surface unit 104, and the adjusting operation can be securely performed.

Figure 10A:
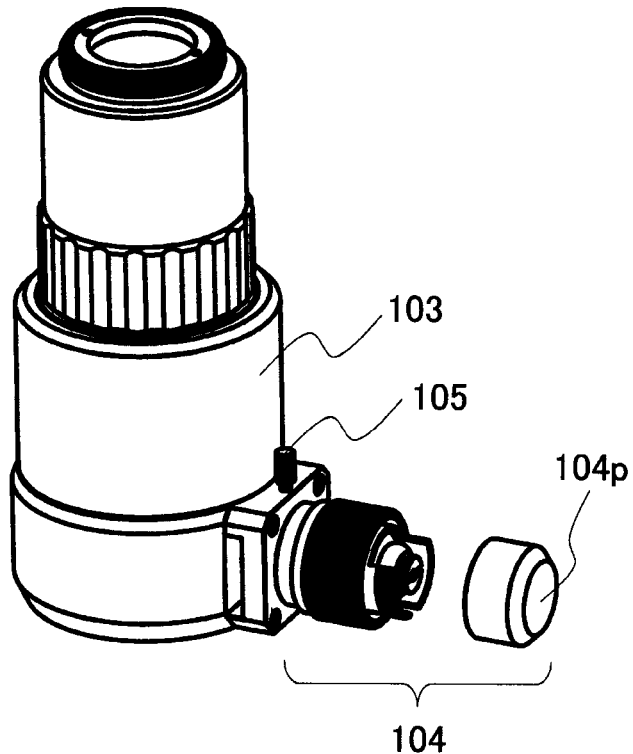
FIGS. 10A and 10B depict states before and after a dust cover is mounted.
Figure 10B:
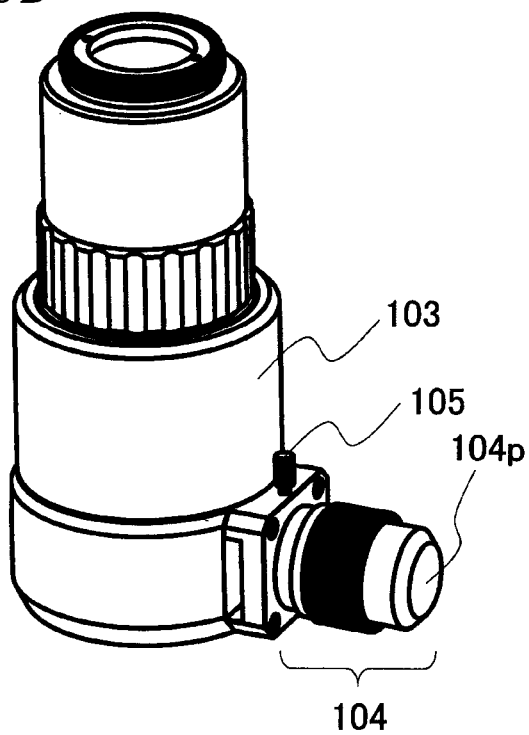

At a state where the reference surface 104*a* is fixed at an arbitrary inclined angle, the reference surface unit can be used with the inclination adjusting unit 104*f* being demounted and a dust cover 104*p* being mounted instead of the cap 104*m*. FIG. 10A depicts a state before the mounting and FIG. 10B depicts a state after the mounting. Thereby, when performing the comparison measurement with the reference surface being fixed to the optical axis of the interference objective lens or another specific position at an arbitrary angle, it is possible to prevent the reference surface from being inadvertently offset. Also, when the reference surface 104*a* is configured to be slidable in the optical axis direction, as described in the second illustrative embodiment, it is possible to operate the adjusting screw 104*i* with the dust cover 104*p* being mounted. Therefore, when a scale is added to the outer periphery of the adjusting screw 104*i*, it is also possible to conveniently measure the step amount of the measurement target.

Figure 11:
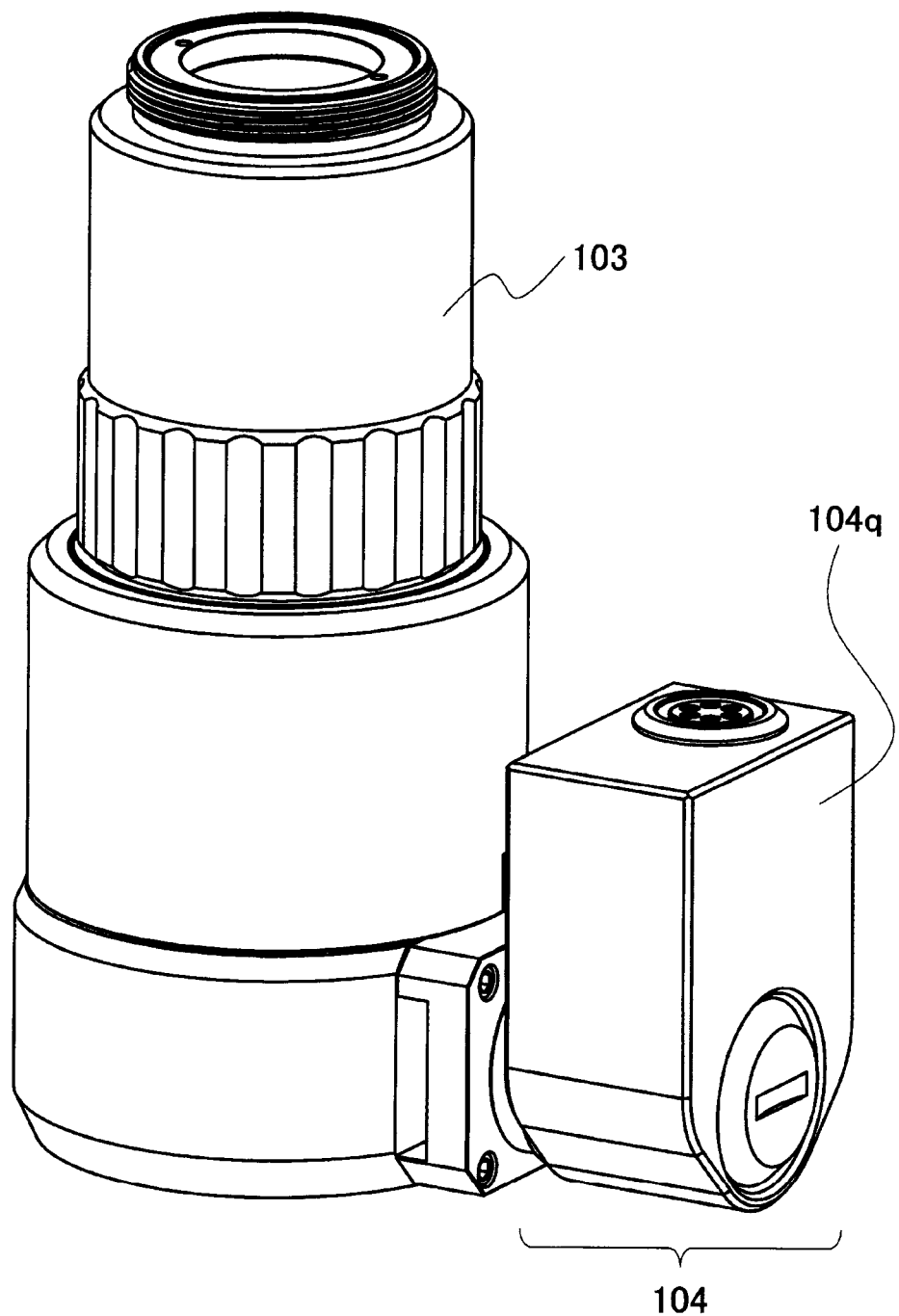
FIG. 11 depicts a state where an automatic inclination adjusting unit is mounted.

The inclination adjusting unit 104*f* is configured to be demountable, so that it is possible to use not only a member configured to manually adjust an amount of inclination but also an automatic adjusting member having a PZT and an actuator embedded therein and capable of performing numerical control. FIG. 11 depicts an example where an automatic inclination adjusting unit 104*q* is mounted, instead of the manual inclination adjusting unit 104*f* shown in FIG. 6. The automatic adjusting member is used, so that even when the interference objective lens is used for a numerically controlled image measurement device, it is possible to control the adjustment of the inclination of the reference surface from a personal computer (PC). Also, in a manual measurement system such as a microscope, the automatic inclination adjusting unit can be appropriately replaced and used with an inclination adjusting unit having another adjusting mechanism and an inclination adjusting mechanism having combined rough movement and fine movement.

<Fourth Illustrative Embodiment>

In the interference objective lens of the disclosure, the reference surface can be replaced. Therefore, when a reference surface unit set having a plurality of reference surface units of which at least one of a reflectivity, an arbitrary shape to be formed, a step and a shape pattern of the reference surface is different from each other is prepared in advance, it is possible to perform the measurement precisely and effectively by sequentially replacing the reference surface with an appropriate reference surface corresponding to the texture of the surface to be measured. Also, when preparing the reference surface unit set, it is possible to perform the measurement more efficiently if the adjustment of the inclined angles of the reference surfaces of the reference surface units has been completed in advance.

The configuration of the interference objective lens of the disclosure can be appropriately changed within the scope of the technical spirit described in the disclosure, and the changes or modifications are also included within the technical scope of the disclosure.

What is claimed is:

1. An interference objective lens comprising:
   an objective lens configured to converge a light to be emitted from a light source toward a measurement target;
   a reference surface unit having a reference surface; and
   a beam splitter configured to split a light having passed through the objective lens into a reference optical path facing toward the reference surface and a measurement optical path facing toward the measurement target, to synthesize a reflected light from the reference surface and a reflected light from the measurement target, and to output the same as an interference light, wherein
   the reference surface unit is configured to be replaceable,
   the reference surface unit is configured to adjust an inclined angle of the reference surface,
   the reference surface unit comprises a lock mechanism for fixing the inclined angle at an arbitrary angle,
   the inclined angle of the reference surface can be adjusted using an inclination adjusting unit configured to be detachably mounted to the reference surface unit,
   the reference surface unit includes a movable bearing provided to change an inclined posture, and the inclination adjusting unit,
   the inclination adjusting unit has a cylindrical main body, and an inclination adjusting knob having a protrusion penetrating the cylindrical main body from an outside to an inside and capable of changing a protruding level of the protrusion into the inside of the cylindrical main body, the inclination adjusting unit is provided such that the cylindrical main body surrounds the movable bearing, and an outer wall of the movable bearing where a tip of the protrusion is pressed has a spherical shape.

2. The interference objective lens according to claim 1, wherein the reference surface unit is mounted so that it can be freely attached and detached.

3. The interference objective lens according to claim 1, wherein the reference surface of the reference surface unit is formed as an arbitrary shape other than a planar surface, a step or a shape pattern.

4. The interference objective lens according to claim 3, wherein the arbitrary shape is a shape corresponding to a surface shape of the measurement target.

\* \* \* \* \*